United States Patent Office 2,794,808
Patented June 4, 1957

2,794,808
NEW QUATERNARY AMMONIUM SALTS

Otto Albrecht, Neuewelt, near Basel, and Erich Matter, Riehen, Switzerland, assignors to Ciba Limited, Basel, Switzerland, a Swiss firm No Drawing. Application August 8, 1955,
Serial No. 527,128

9 Claims. (Cl. 260—309.6)

The present invention provides valuable new quaternary ammonium salts by quaternating a tertiary amine containing at least one non-aromatic hydrocarbon radical of more than 7 carbon atoms with a compound of the formula (1)

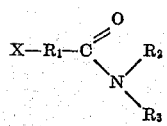

in which $R_1$ represents an alkylene radical which contains less than 8 carbon atoms and may be interrupted by heteroatoms, $R_2$ and $R_3$ represent hydrogen, an alkyl radical or a substituted alkyl radical and X a substituent capable of forming the anion of a quaternary ammonium compound.

In the tertiary amine used as starting material the non-aromatic hydrocarbon radical containing more than 7 carbon atoms may be bound directly to the tertiary nitrogen atom. Accordingly, when the hydrocarbon radical is an alkyl radical these compounds can be regarded as derivatives of alkylamines of high molecular weight, for example, of octylamine, octadecylamine, oleylamine and especially of dodecylamine. It is, however, of advantage to use compounds in which at least one hydrocarbon radical containing more than 7 carbon atoms is bound to the tertiary nitrogen atom through one or more heteroatoms. As heteroatoms there come into consideration especially oxygen or nitrogen atoms, which may form part of functional groups or heterocyclic rings. As functional groups there may be mentioned ether groups and especially acyl groups, such as ester or amide groups. When an ester group is present the tertiary amine used as starting material may be derived from non-aromatic carboxylic acid, for example, capric acid, lauric acid, myristic acid, palmitic acid, stearic acid, oleic acid, linoleic acid, and an alkanolamine containing at least one amono group such, for example, as dimethyl-ethanolamine, dipropyl-ethanolamine or triethanolamine. When an amide group is present, the compounds may be derivatives of the carboxylic acids mentioned above with a di- or poly-amine such, for example, as ethylene diamine, propylene diamine, hexamethylene diamine, diethylene triamine, triethylene tetramine or tetraethylene pentamine, or from hydroxyalkylation products of such di- or poly-amines, such as dihydroxyethyl-ethylene diamine or trihydroxyethyl-ethylene diamine. When at least one non-aromatic hydrocarbon radical having more than 7 carbon atoms is bound to the tertiary nitrogen atom through a heterocyclic radical, the latter is advantageously an imidazoline ring. Such imidazoline derivatives having a hydrocarbon radical of high molecular weight and a side chain containing nitrogen are described in U. S. patent application Serial No. 467,639 filed November 8, 1954 by Otto Albrecht et al.

Thus for example it is of advantage to quaternate a tertiary amine of the formula (2)

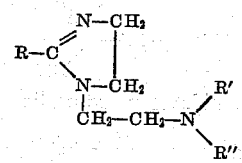

in the manner described above, in which R represents an aliphatic hydrocarbon radical with at least 7 carbon atoms and R' and R" represent ethyl or methyl groups or hydroxyalkyl radicals such as hydroxyethyl- or hydroxypropyl groups.

Other starting materials which produce valuable results in the present process are those of the formula (3)

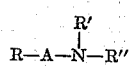

in which R represents a radical derived from an aliphatic carboxylic acid with at least 8 carbon atoms and bound to the —CO-group through a heteroatom at A, A represents an alkylene radical of low molecular weight and R' and R" represent alkyl groups of low molecular weight, for example ethyl or methyl groups. As compounds of such composition there may be mentioned for instance the carboxylic acid esters of the formula (4)

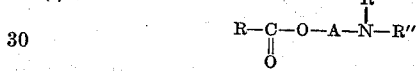

and especially the carboxylic acid amides of the formula (5)

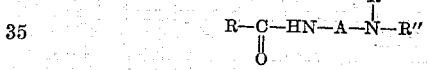

In the Formulae 4 and 5 R represents an aliphatic hydrocarbon radical with at least 7 carbon atoms, A represents an alkylene radical of low molecular weight and R' and R" represent alkyl groups of low molecular weight. More especially tertiary amines of the formula (6)

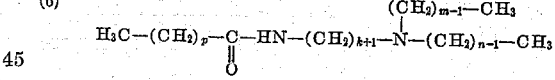

come into consideration, in which $k$, $m$ and $n$ represent whole numbers of at most 2 and $p$ is a whole number of at least 10 and at most 16. For the choice of the starting materials for the preparation of the compounds of the Formulae 2 to 6, especially of the compounds yielding the radical R, reference is made to the above described data.

As a rule the starting materials of the present process are advantageously prepared by acylating an alkanolamine or di- or polyamine mentioned above with a carboxylic acid of the kind mentioned above or a functional derivative thereof, such as an acid chloride, ester or anhydride thereof, and, if no tertiary amino group is present in the starting materials, introducing a tertiary amino group by alkylation or hydroxyalkylation, and especially by hydroxyethylation by means of ethylene oxide. When the intermediate product is to be an imidazoline derivative, it can be prepared in the manner described in U. S. patent application Serial No. 467,639 filed November 8, 1954 by Otto Albrecht et al.

As compounds of the Formula 1 which are used in the present process for quaternating the tertiary amines it is of advantage to use those containing as substituent X which is capable of forming the amine of the quaternary compound a halogen atom, for example a bromine atom or more especially a chlorine atom. $R_1$ can be an alkylene radical of low molecular weight, for example an ethylene or methylene group, and the nitrogen atom can be further substituted with one or two alkyl groups of low molecular weight or, advantageously, contain no further substituents. Accordingly, for the quaternation there comes into consideration above all a compound of the formula (7)
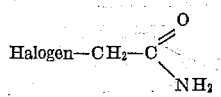

such as bromacetamide or more particularly chloroacetamide.

Since it is of advantage to use halogen-carboxylic acid amides for making the compounds used in the invention, the quaternary ammonium salts will usually contain as the anion a halogen-ion, and especially a chlorine-ion. These halogen-ions may of course be exchanged for the anions of other inorganic or organic acids.

The quaternation of the tertiary amines can be carried out by the usual known methods, for example by heating the tertiary amines with the compounds of Formula 1 to a temperature of about 100° C., with or advantageously without adjuvants and preferably with the exclusion of oxygen, for example in a nitrogen atmosphere.

The new compounds obtained according to the present process are quaternary ammonium salts which contain in addition to at least one non-aromatic hydrocarbon radical of more than 7 carbon atoms a radical bound to the quaternary nitrogen atom of the formula

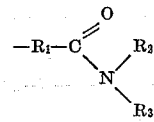

in which $R_1$ represents an alkylene radical with less than 8 carbon atoms and may be interrupted by heteroatoms, and $R_2$ and $R_3$ represent hydrogen, an alkyl radical or a substituted alkyl radical.

The new quaternary ammonium compounds exhibit strong cation active properties and are as a rule readily soluble in water, the solutions producing ample foam. They may be used as washing agents, wetting agents, dispersing agents or emulsifying agents. For example they may be used for the preparation of effective detergents with very good foaming properties for the hair, or other cosmetic preparations. As a rule they possess very good resistance to oxidizing agents, especially hydrogen peroxide.

The following examples illustrate the invention, the parts being by weight unless otherwise stated and the relationship of parts by weight to parts by volume being the same as that of the kilogram to the liter:

Example 1

28.3 parts of coconut oil fatty acid esterified with N:N-dimethyl-ethanolamine and 10.3 parts of chloracetamide are heated in a current of nitrogen in a boiling water bath, while stirring, until the reaction product is clearly soluble in water, which is the case in a short time. The resulting quaternary ammonium salt in aqueous solution produces ample foam.

Example 2

200 parts of distilled coconut oil fatty acid, 103 parts of diethylene triamine, 0.2 part of boric acid and 150 parts of xylene are heated under reflux until the elimination of water ceases. The xylene flowing from the reflux condenser, before it is returned to the reaction vessel, is passed through a water separator in which the water is continuously removed. After about 8 hours the reaction is finished, and the solvent is distilled off under reduced pressure. 148 parts of the imidazoline so obtained are heated at 120° C. and then 44 parts of ethylene oxide are introduced in the foam of a finely distributed gas stream at 120-125° C.

36.7 parts of the resulting oxyethylation product and 9.4 parts of chloracetamide are heated in a current of nitrogen in a boiling water bath, while stirring, until the reaction product is clearly soluble in water, which is the case after a short time.

Example 3

93 parts of the imidazoline mentioned in Example 2 and obtained from distilled coconut oil fatty acid and diethylene triamine, are heated at 120° C. and then 43 parts of propylene oxide are introduced in the form of a finely distributed gas stream at 120°–130° C.

18.7 parts of the resulting hydroxyethylation product and 4.7 parts of chloracetamide are heated in a current of nitrogen in a boiling water bath, while stirring, until the reaction product is clearly soluble in water, which is the case after a short time.

Example 4

5.6 parts of the acylation product of N:N-dimethyl-propylene diamine with coconut oil fatty acid and 1.9 parts of chloracetamide are heated in a current of nitrogen in a water bath, during which the formation of the quaternary ammonium salt takes place in a short time. The quaternary ammonium salt is clearly soluble in water.

Example 5

4 parts of the acylation product of N:N-diethyl-propylene diamine with commercial stearic acid and 0.94 part of chloracetamide are heated in a current of nitrogen in a boiling water bath for 6 hours while stirring. The quaternary ammonium salt so obtained is soluble in water.

Example 6

21.6 parts of one of the quaternary ammonium salts described in Examples 1 to 5 are mixed with 7 parts of lactic acid of about 90% strength, 7.85 parts of a water-soluble condensation product of tertiary dodecyl-mercaptan with ethylene oxide (for example, the product of which the turbidity point of a solution of 0.115 percent strength is about 69° C.), 4.9 parts of N-hydroxy-ethyl-coconut oil fatty acid amide, 2 parts of para-(stearyl-amino)-phenyl-trimethylammonium methosulfate and 56 parts of water. The product so obtained is a detergent for the hair which is very effective and produces ample foam and possesses a very good cleansing effect.

What is claimed is:

1. A water-soluble quaternary ammonium salt which corresponds to the formula

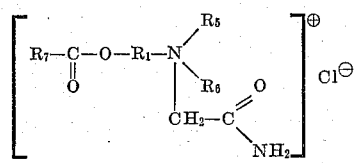

in which $R_1$ represents an alkylene radical containing at the most 3 carbon atoms, $R_5$ and $R_6$ each represent an alkyl radical containing at the most 2 carbon atoms and $R_7$ represents an alkyl radical containing at least 10 and at the most 18 carbon atoms.

2. A water-soluble quaternary ammonium salt which corresponds to the formula

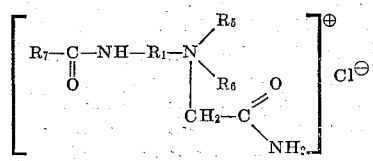

in which $R_1$ represents an alkylene radical containing at the most 3 carbon atoms, $R_5$ and $R_6$ each represent an alkyl radical containing at the most 2 carbon atoms and $R_7$ represents an alkyl radical containing at least 10 and at the most 18 carbon atoms.

3. A water-soluble quaternary ammonium salt which corresponds to the formula

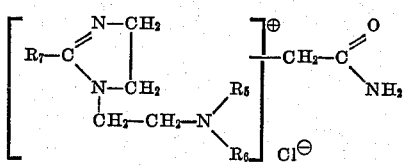

in which $R_5$ and $R_6$ each represent hydroxyalkyl group containing at the most 2 carbon atoms and $R_7$ represents an alkyl radical containing at least 10 and at the most 18 carbon atoms.

4. The quaternary ammonium salt of the formula

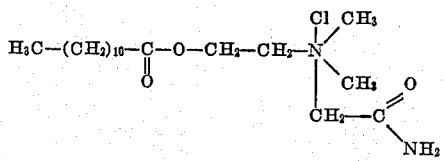

5. The quaternary ammonium salt of the formula

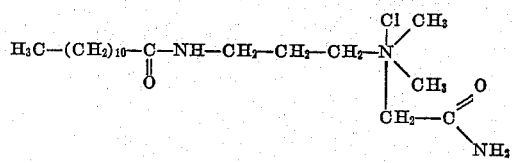

6. The quaternary ammonium salt of the formula

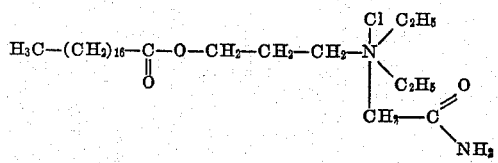

7. The quaternary ammonium salt of the formula

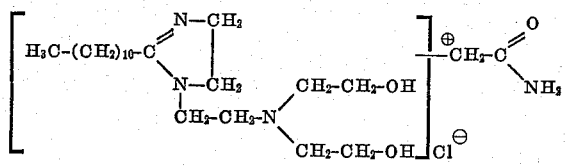

8. The quaternary ammonium salt of the formula

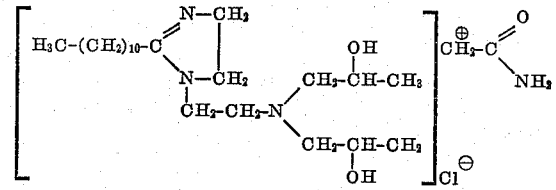

9. A water-soluble quaternary ammonium salt which corresponds to the formula

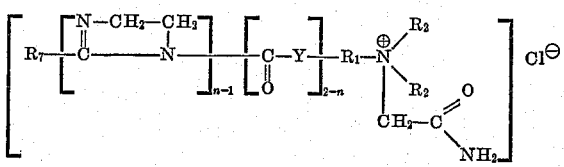

in which $R_1$ represents an alkylene radical containing at the most 3 carbon atoms, $R_2$ represents a member selected from the group consisting of lower alkyl and lower hydroxyalkyl radicals, $R_7$) represents an alkyl radical containing at least 10 and at the most 18 carbon atoms, Y represents a member selected from the group consisting of —O— and —NH—, and $n$ denotes a whole number of at the most 2.

No references cited.